United States Patent
Choi et al.

(10) Patent No.: US 8,977,474 B2
(45) Date of Patent: Mar. 10, 2015

(54) DIESEL-GASOLINE DUAL FUEL POWERED COMBUSTION ENGINE SYSTEM PROVIDED WITH SPARK-ASSISTED FOULING FREE EGR SYSTEM

(71) Applicant: Hyundai Motor Company, Seoul (KR)

(72) Inventors: Dae Choi, Hwaseong-si (KR); Hyunsung Jung, Anyang-si (KR); Minyoung Ki, Seoul (KR); Hyeungwoo Lee, Suwon-si (KR)

(73) Assignee: Hyundai Motor Company, Seoul (KR)

( * ) Notice: Subject to any disclaimer, the term of this patent is extended or adjusted under 35 U.S.C. 154(b) by 168 days.

(21) Appl. No.: 13/713,640

(22) Filed: Dec. 13, 2012

(65) Prior Publication Data
US 2013/0152908 A1    Jun. 20, 2013

(30) Foreign Application Priority Data
Dec. 16, 2011 (KR) .......... 10-2011-0136614

(51) Int. Cl.
*F02D 19/06* (2006.01)
*F02M 25/07* (2006.01)
*F02D 41/00* (2006.01)
*F02D 41/30* (2006.01)
(Continued)

(52) U.S. Cl.
CPC ....... *F02M 25/0701* (2013.01); *F02D 41/0065* (2013.01); *F02D 41/008* (2013.01); *F02D 41/3047* (2013.01); *F02M 25/0749* (2013.01); *F02D 19/0649* (2013.01); *F02B 47/08* (2013.01); *F02B 69/02* (2013.01); *F02M 25/0735* (2013.01); *F02D 41/0025* (2013.01); *Y02T 10/47* (2013.01); *Y02T 10/128* (2013.01); *F02M 25/0707* (2013.01)
USPC ........... 701/108; 123/575; 123/295; 123/431; 123/304; 123/568.11

(58) Field of Classification Search
CPC .... F02M 25/0718; F02D 19/06; F02D 19/08; F02D 19/105
USPC .......... 701/108; 123/575–578, 295, 431, 304, 123/568.11
See application file for complete search history.

(56) References Cited

U.S. PATENT DOCUMENTS

| | | | |
|---|---|---|---|
| 5,050,550 A * | 9/1991 | Gao | 123/275 |
| 6,679,224 B2 * | 1/2004 | Stanglmaier | 123/431 |
| 7,409,926 B2 * | 8/2008 | Sun et al. | 123/1 A |

(Continued)

FOREIGN PATENT DOCUMENTS

| | | |
|---|---|---|
| DE | 43 31 509 C1 | 9/1993 |
| EP | 0 686 759 A1 | 12/1995 |

(Continued)

*Primary Examiner* — Erick Solis
(74) *Attorney, Agent, or Firm* — Morgan, Lewis & Bockius LLP

(57) ABSTRACT

A diesel-gasoline dual fuel powered combustion engine system is provided with spark-assisted fouling free EGR system in which gasoline and air are homogeneously combined and supplied to cylinders and then a diesel fuel is injected and combusted together. The system may include: a plurality of cylinders each having a fuel injector; and an exhaust line through which flows an exhaust gas discharged as a fuel from each cylinder is combusted; wherein gasoline fuel combustion type is adapted to one or more cylinder of the plurality of the cylinders, and diesel-gasoline fuel pre-mixed combustion type is adapted to the other cylinders.

2 Claims, 2 Drawing Sheets

(51) Int. Cl.
 *F02B 47/08* (2006.01)
 *F02B 69/02* (2006.01)

(56) References Cited

U.S. PATENT DOCUMENTS

| | | | |
|---|---|---|---|
| 2006/0180121 A1* | 8/2006 | Wickman et al. | 123/299 |
| 2007/0256648 A1* | 11/2007 | Sun et al. | 123/1 A |
| 2010/0024417 A1 | 2/2010 | Pierpont et al. | |
| 2011/0100323 A1 | 5/2011 | Bradley et al. | |
| 2013/0087123 A1 | 4/2013 | Ki et al. | |

FOREIGN PATENT DOCUMENTS

| | | |
|---|---|---|
| JP | 62-41940 A | 2/1987 |
| JP | 2002206473 A | 7/2002 |
| JP | 2005054771 A | 3/2005 |
| JP | 2007263039 A | 10/2007 |

* cited by examiner

DIESEL-GASOLINE DUAL FUEL POWERED COMBUSTION ENGINE SYSTEM PROVIDED WITH SPARK-ASSISTED FOULING FREE EGR SYSTEM

CROSS-REFERENCE(S) TO RELATED APPLICATIONS

The present application claims priority of Korean Patent Application Number 10-2011-0136614 filed Dec. 16, 2011, the entire contents of which application is incorporated herein for all purposes by this reference.

BACKGROUND OF INVENTION

1. Field of Invention

The present invention relates to a diesel-gasoline dual fuel powered combustion engine system provided with spark-assisted fouling free EGR system, and in particular to an exhaust gas regeneration control system of a gasoline and diesel fuel-combined homogeneous charge compression ignition engine and a method thereof which make it possible to inhibit the production of a sediment produced in an EGR system in such a way to control the timing of an ignition of a gasoline and diesel fuel-combined HCCI engine.

2. Description of Related Art

The exhaust gas recirculation (EGR) system is widely installed in vehicles so as to reduce NOx in such a way that an exhaust gas from an engine is re-circulated and introduced into the interior of the cylinder. The above-mentioned EGR system is provided so as to meet the exhaust gas regulations of the engine.

The EGR system adapted to a diesel fuel engine will be described. Since an exhaust gas is re-circulated and introduced into the cylinder, a problem occurs at the EGR system owing to a particle matter (PM) including a soluble organic fraction (SOF) and soot. Such a problem causes the performance, fuel efficiency and exhaust characteristics to worsen.

In addition, as one of the ways to effectively cope with the reinforced regulations and high fuel efficiency demands, it is recommended that the advantages of a diesel fuel engine and a gasoline fuel engine are taken and combined.

As one of the specific ways, there is a diesel-gasoline dual fuel powered combustion engine is capable of reducing NOx and realizing high fuel mileage being equal to that of diesel engine.

However, as to the diesel-gasoline dual fuel powered combustion engine provided with EGR system, a fouling cannot be reduced efficiently.

Hereby, the way as described above is not capable of reducing particle material but fouling.

Therefore, it is required to prevent particle material from being included in EGR gas recirculating by replacing the diesel-gasoline dual fuel powered combustion with gasoline combustion The information disclosed in this Background section is only for enhancement of understanding of the general background of the invention and should not be taken as an acknowledgement or any form of suggestion that this information forms the prior art already known to a person skilled in the art.

SUMMARY OF INVENTION

Accordingly, the present invention is made to resolve the problems encountered in the conventional art. Various aspects of the present invention provide for a diesel-gasoline dual fuel powered combustion engine system provided with spark-assisted fouling free EGR system which can inhibit the production of particle material in an EGR system in such a manner to control the method of an ignition of a gasoline and diesel dual fuel powered combustion engine.

Various aspects of the present invention provide for a diesel-gasoline dual fuel powered combustion engine system provided with spark-assisted fouling free EGR system in which gasoline and air are homogeneously combined and injected to cylinders and then a diesel fuel is injected and combusted together, comprising a plurality of cylinders each having a fuel injector; and an exhaust line through which flows an exhaust gas discharged as a fuel from each cylinder is combusted; wherein gasoline fuel combustion type is adapted to one or more cylinder of the plurality of the cylinders, and diesel-gasoline fuel pre-mixed combustion type is adapted to the other cylinders.

In addition, an ignition plug may be installed at one of the plurality of cylinders.

In addition, the cylinder in which is installed an ignition plug may be configured to combust gasoline, and the other cylinders are configured to combust a mixture of gasoline and diesel fuels.

In addition, only the exhaust gas from the cylinder in which the ignition plug may be installed flows through an EGR line.

In addition, a bypass valve is installed at the intermediate portion of the EGR line, and the bypass valve is configured to selectively discharge the exhaust gas from the cylinder in which the ignition plug may be installed to either the side of a turbine or a post-process apparatus.

According to the EGR control system of a diesel-gasoline dual fuel powered combustion engine system provided with spark-assisted fouling free EGR system, it is possible to efficiently control the timing of an ignition in a cylinder igniting pre-mixed dual fuel and a cylinder igniting gasoline respectively so as to reduce particle material accumulated in an EGR system. Thereby, an operability of an EGR system can be improved.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Figure 1:
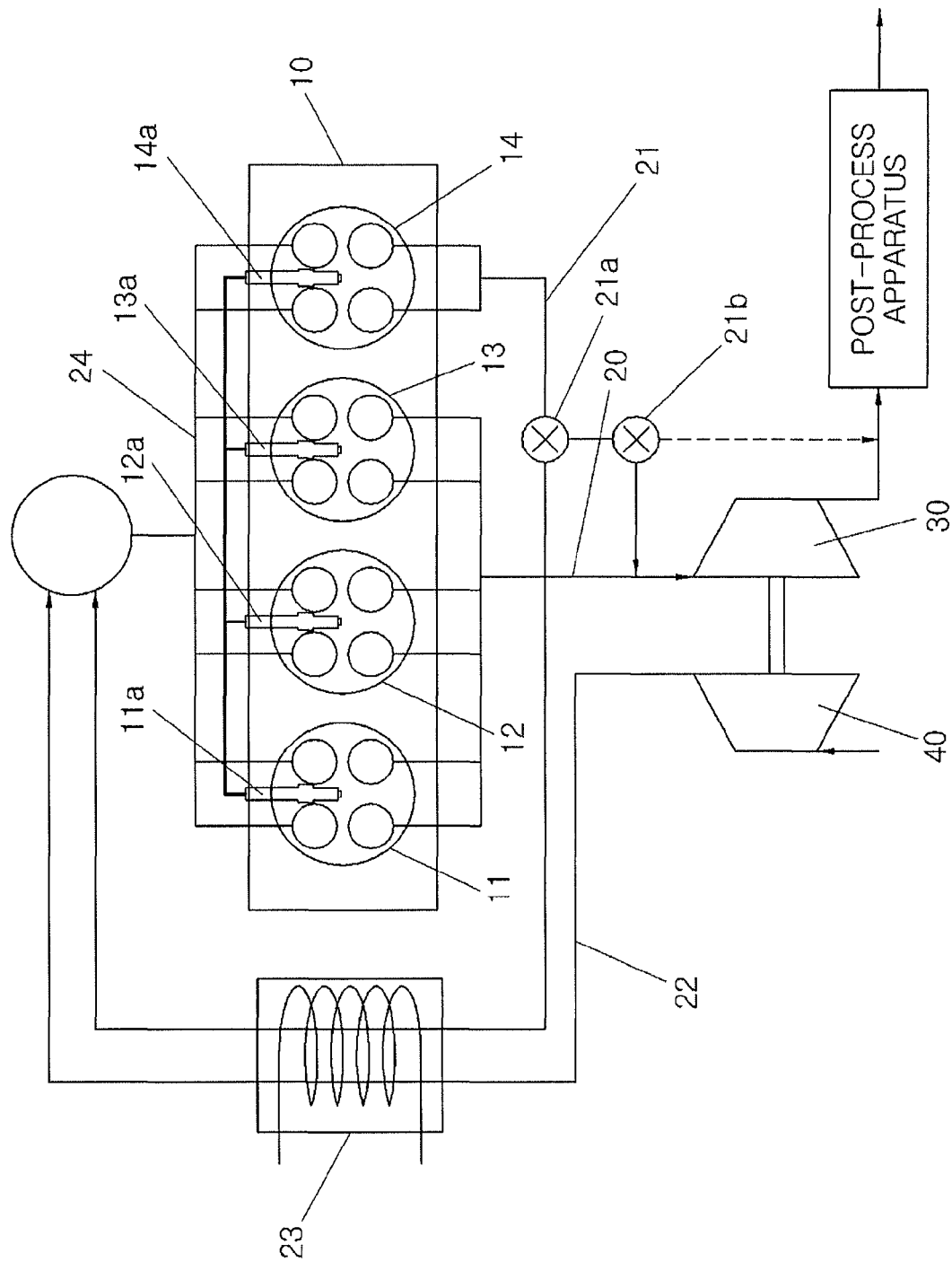
FIG. 1 is a schematic view illustrating an exemplary diesel-gasoline dual fuel powered combustion engine system provided with spark-assisted fouling free EGR system according to the present invention.

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

As shown in FIG. 1, a diesel-gasoline dual fuel powered combustion engine system provided with spark-assisted fouling free EGR system according to a first exemplary embodiment of the present invention comprises a plurality of cylinders 11, 12, 13 and 14, and exhaust gas from the cylinders 11, 12, 13 and 14 flows along an exhaust line 20, thus driving a turbine 30. As a compressor 40 installed on a same axis as the turbine 30 rotates, a boost pressure occurs in a suction line 22. At this time, among the cylinders 11, 12, 13 and 14, a fourth cylinder 14 is communicated with an EGR line 21 so that an EGR gas can be supplied to the suction line 22. In addition, a bypass valve 21a is provided on the EGR line 21, thus controlling an EGR rate.

Figure 2:
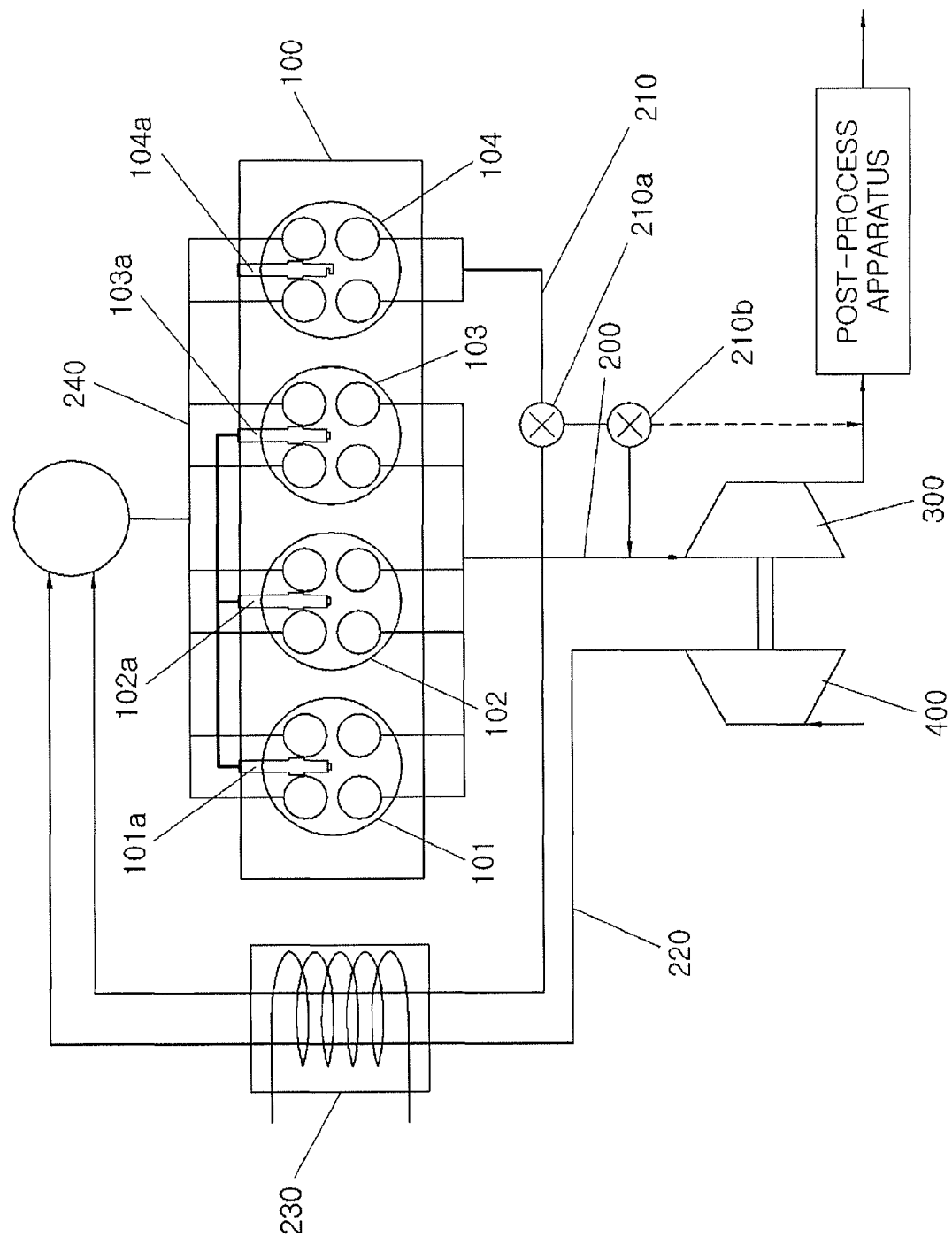
FIG. 2 is a schematic view illustrating an exemplary EGR control system of diesel-gasoline dual fuel powered combustion engine system provided with spark-assisted fouling free EGR system according to the present invention.

Meanwhile, FIG. 2 is a schematic view illustrating an EGR control system of a diesel-gasoline dual fuel powered combustion engine system provided with spark-assisted fouling free EGR system according to second exemplary embodiment of the present invention. As shown therein, the EGR control system of a gasoline and diesel fuel-combined HCCI engine according to an embodiment of the present invention comprises a plurality of cylinders 101, 102, 103 and 104 each equipped with a fuel injector, an exhaust line 200 through which the fuel from the cylinders 101, 102, 103 and 104 is combusted and exhausted, a turbine 300 rotating by means of an exhaust gas supplied from the exhaust line and a compressor 400 which rotates together with the turbine 300 and supplies a compression exhaust gas to an EGR cooler 230. Here, one of the plurality of the cylinders 101, 102, 103 and 104 is formed of an EGR gas supply cylinder in which is installed an ignition plug 104a. In other words, the EGR gas supply cylinder 104 belongs to a gasoline engine generating a driving force by combusting a gasoline fuel.

In addition, the EGR gas supply cylinder 104 is connected with an EGR line 210 for thereby supplying an EGR gas.

A 4-cylinder engine is adapted in the present embodiment of the present invention, but an engine with more than 4 cylinders can be adapted. As an example, as shown in FIG. 2, when a 4-cylinder engine formed of a first cylinder 101, a second cylinder 102, a third cylinder 103 and a fourth cylinder 104 is adapted, the first cylinder 101, the second cylinder 102 and the third cylinder 103 are configured to belong to a diesel and gasoline fuel-combined ignition engine, and the fourth cylinder 104 is configured to belong to a gasoline engine.

At an intake stroke or during intake stroke, gasoline fuel and air previously injected through a port and EGR gas is supplied to the first cylinder 101, the second cylinder 102 and the third cylinder 103 in a state of being mixed together. During a compression stroke of a piston, a diesel fuel is sprayed by way of fuel injectors 101a, 102a and 103a. At this time, the diesel fuel is used as an ignition source for pre-mixed diesel-gasoline fuel uniformly distributed in the cylinders and thereby flames are propagated to the combined gases, thus generating a driving force.

The first cylinder 101, the second cylinder 102 and the third cylinder 103 are configured to belong to a fuel-combined ignition engine to make sure that a smokeless combustion characteristic which is a feature of a mixed combustion can be used, and the fourth cylinder 104 is configured to belong to a gasoline engine, so the flame ignitions can be proceeded by an ignition plug 104a when the fourth cylinder 104 is driven An EGR line 210 is connected so that part of the exhaust gas from the fourth cylinder 104 can be re-circulated. One cylinder is selected from the four cylinders 101, 102, 103 and 104 as an EGR gas supply-dedicated cylinder so that an exhaust gas discharged after a driving force is generated can be used as an EGR gas. It is preferred that the remaining cylinders are configured to perform exhaust operations after a driving force is generated.

Bypass valves 210a and 210b are installed at an intermediate portion of the EGR line 210. The bypass valves 210a and 210b are installed at two places, so part of the exhaust gas can be supplied to the side of the turbine 300 or can be supplied to a post-process apparatus. By controlling open proportion of the bypass valves 210a and 210b, the exhaust gas from the fourth cylinder 104 can be used exclusively for the EGR or only partially, so the HCCI engine EGR system can be simplified.

The diesel-gasoline dual fuel powered combustion engine system provided with spark-assisted fouling free EGR system according to a second exemplary embodiment of the present invention is directed to adjusting the timing of ignitions by controlling the timing of operations of an ignition plug 104a of the fourth cylinder 104 and to supplying the exhaust gas of the fourth cylinder 104 belonging to the gasoline engine to the EGR line 210, so the granulate matter accumulated at the EGR line 210 and the EGR cooler 230 can be minimized by pre-mixed combustion of the first cylinder 101, the second cylinder 102, and the third cylinder 103.

For convenience in explanation and accurate definition in the appended claims, the terms upper or lower, front or rear, inside or outside, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A diesel-gasoline dual fuel powered combustion engine system provided with spark-assisted fouling free EGR system in which gasoline and air are homogeneously combined and supplied to cylinders and then a diesel fuel is injected and combusted together, comprising:
    a plurality of cylinders each having a fuel injector; and
    an exhaust line through which an exhaust gas discharged as a fuel from each cylinder flows and is combusted,
    wherein gasoline fuel combustion is adapted to one or more of the plurality of the cylinders, and diesel-gasoline fuel pre-mixed combustion type is adapted to the other cylinders,
    wherein an ignition plug is installed at one of the plurality of cylinders,
    wherein the cylinder in which the ignition plug is installed is configured to combust gasoline, and the other cylinders are configured to combust a mixture of the gasoline and the diesel fuels, and
    wherein only the exhaust gas from the cylinder in which the ignition plug is installed flows through an EGR line.

2. The diesel-gasoline dual fuel powered combustion engine system provided with spark-assisted fouling free EGR system of claim 1, wherein a bypass valve is installed at an intermediate portion of the EGR line, and the bypass valve is configured to selectively discharge the exhaust gas from the cylinder in which the ignition plug is installed to either a side of a turbine or a post-process apparatus.

* * * * *